United States Patent
Hekmatpour et al.

(10) Patent No.: US 7,870,381 B2
(45) Date of Patent: Jan. 11, 2011

(54) SCHEMA-BASED PORTAL ARCHITECTURE FOR ASSESSMENT AND INTEGRATION OF SILICON IPS

(75) Inventors: Amir Hekmatpour, Cary, NC (US); Azadeh Salehi, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 932 days.

(21) Appl. No.: 11/350,312

(22) Filed: Feb. 8, 2006

(65) Prior Publication Data

US 2007/0201442 A1 Aug. 30, 2007

(51) Int. Cl.
*H04L 9/00* (2006.01)
*G06F 9/00* (2006.01)
*G06F 9/30* (2006.01)

(52) U.S. Cl. .................. 713/152; 717/120; 717/123; 717/153; 717/154

(58) Field of Classification Search .......... 713/152, 713/189; 719/331; 703/13, 14, 15; 717/120, 717/123, 153–154; 716/4, 8, 12
See application file for complete search history.

(56) References Cited

U.S. PATENT DOCUMENTS

| | | | |
|---|---|---|---|
| 5,285,380 A | 2/1994 | Payton | |
| 5,937,407 A | 8/1999 | Sakata | |
| 6,038,566 A | 3/2000 | Tsai | |
| 6,179,486 B1 | 1/2001 | Wallach et al. | |
| 6,202,111 B1 | 3/2001 | Wallach et al. | |
| 6,205,503 B1 | 3/2001 | Mahalingam | |
| 6,219,734 B1 | 4/2001 | Wallach et al. | |
| 6,247,079 B1 | 6/2001 | Papa et al. | |
| 6,324,538 B1 | 11/2001 | Wesinger, Jr. et al. | |
| 6,418,492 B1 | 7/2002 | Papa et al. | |
| 6,556,983 B1 | 4/2003 | Altschuler et al. | |
| 6,601,075 B1 | 7/2003 | Huang et al. | |
| 6,654,734 B1 | 11/2003 | Mani et al. | |
| 6,701,321 B1 | 3/2004 | Tsai | |
| 6,754,664 B1 | 6/2004 | Bush | |
| 2002/0199110 A1* | 12/2002 | Kean | 713/189 |
| 2004/0004552 A1* | 1/2004 | Yang et al. | 340/825.69 |
| 2004/0030902 A1* | 2/2004 | Asano et al. | 713/176 |
| 2004/0260607 A1* | 12/2004 | Robbins et al. | 705/14 |
| 2005/0086102 A1* | 4/2005 | Harrison et al. | 705/14 |
| 2005/0171722 A1* | 8/2005 | Fritzsche | 702/122 |
| 2005/0243803 A1* | 11/2005 | Fang | 370/352 |
| 2005/0273752 A1* | 12/2005 | Gutberlet et al. | 716/18 |

(Continued)

*Primary Examiner*—Ponnoreay Pich
*Assistant Examiner*—Sayed Beheshti Shirazi
(74) *Attorney, Agent, or Firm*—Daniel H. Schnurmann; Schubert Law Group PLLC

(57) ABSTRACT

Systems, methods, and media for a schema-based portal for assessment and integration of silicon IPs are disclosed. Embodiments may generally include an IP portal system having a portal interface to receive inputs from users and to provide output to users and a database interface to transmit and receive information to and from a silicon IP database and an IP file system. Embodiments of the system may also include a secure access layer (HTTP tunnel, firewall, or proprietary secure access protocol) to securely communicate information and an internal interface protocol and an external interface protocol and the secure access layer. The internal interface protocol may authorize and encrypt communications to an internal user or design system and the external interface protocol may authorize and encrypt communications to an external user or design system. The portal interface may be a Web-based interface and schema-based in some embodiments.

17 Claims, 10 Drawing Sheets

U.S. PATENT DOCUMENTS

2006/0041582 A1* 2/2006 Hekmatpour ............... 707/102
2006/0248575 A1* 11/2006 Levow et al. .................. 726/1
2006/0288353 A1* 12/2006 King et al. ................. 719/331
2007/0078866 A1* 4/2007 Takashima .................. 707/100
2007/0185898 A1* 8/2007 Hekmatpour et al. ....... 707/102
2008/0208886 A1* 8/2008 Zhang ....................... 707/102

* cited by examiner

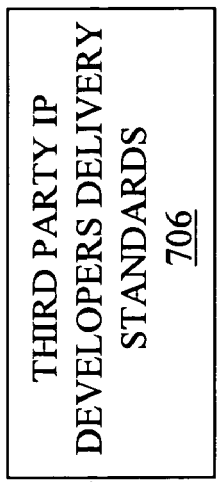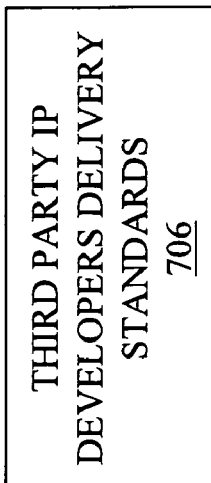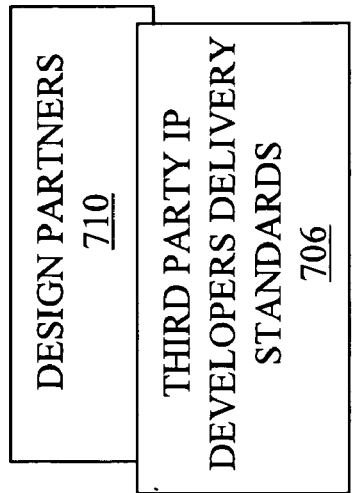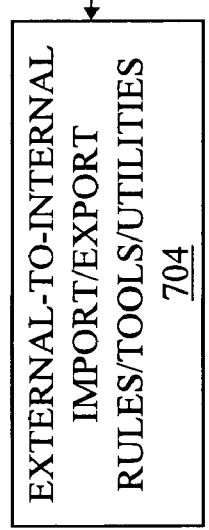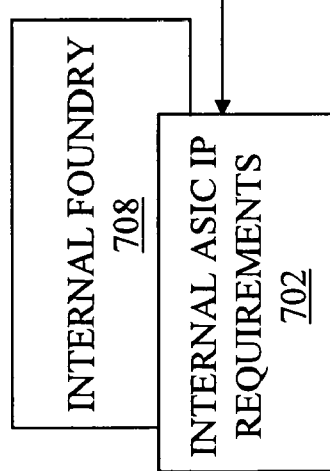
FIG 7A
FIG 7B
FIG 7C

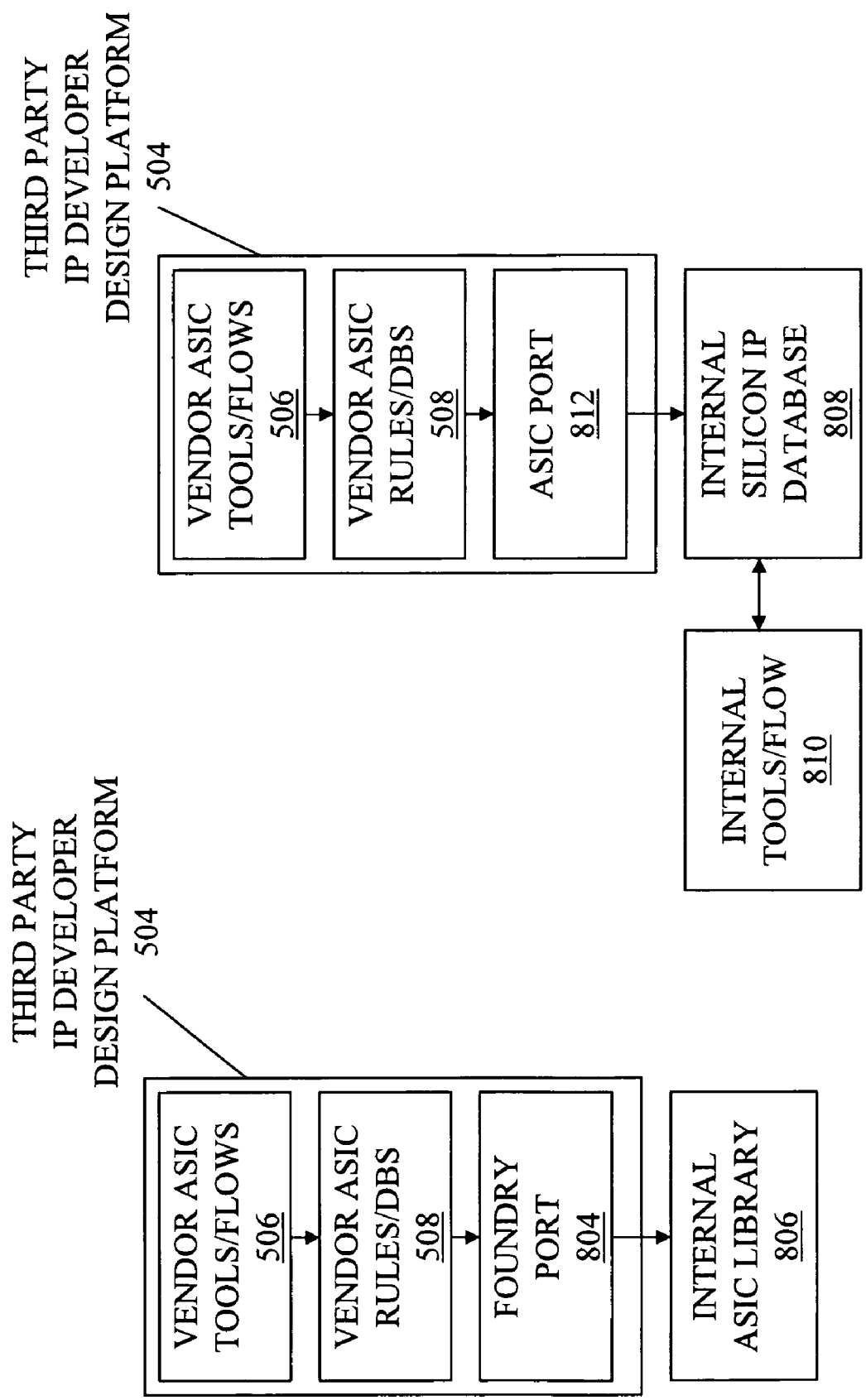

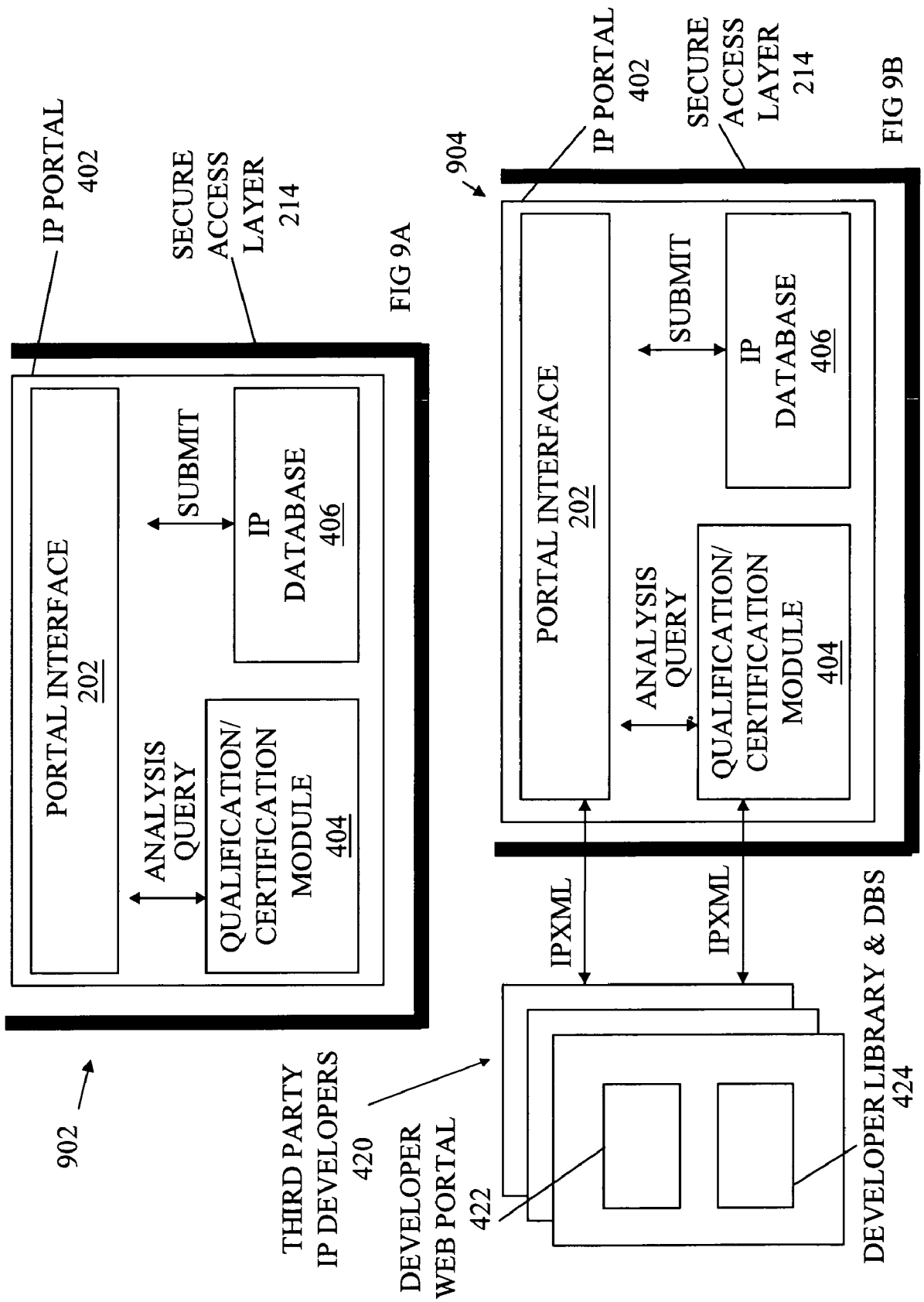

US 7,870,381 B2

SCHEMA-BASED PORTAL ARCHITECTURE FOR ASSESSMENT AND INTEGRATION OF SILICON IPS

FIELD OF INVENTION

The present invention generally relates to the field of silicon intellectual property- (IP-) based integrated circuit (IC) design. More particularly, the present invention relates to systems, methods, and media for schema-based portal architecture for assessment of silicon IPs for integration with an organization's proprietary in-house design flow for IC chip or other silicon designs.

BACKGROUND

Design of an Integrated Circuit (IC) chip such as Application-Specific ICs (ASICs) and system-on-chips (SoC's) is a very complex, expensive, and time-consuming task. To help streamline this task, designers often utilize silicon IPs (also known as intellectual property blocks, IP cores, or integrated circuit macros) to facilitate the design task. IPs are units of reusable design whose use may have been licensed from a third party IP vendor. IPs may represent design components such as processor units, interface protocols, data storage elements, functions, etc. that may be utilized in the design of an ASIC or SoC. IPs commonly take the form of a digital, analog, or mixed signal IC described in a hardware description language (HDL) such as Verilog, VHDL, or SystemC but may also be represented as a netlist or physical layout. While using IP blocks in a design can provide significant efficiencies when compared with designing a chip at the transistor level or gate level, management of a large number of IP blocks from multiple IP vendors in various design languages and databook format and configurations has its own complexities.

As ASICs, SoCs and other designs grow larger and more sophisticated, the task of integrating complex silicon IP blocks into a system becomes increasingly labor intensive and time consuming. Additionally, the number and complexity of IPs used in SoCs and ASICs is also increasing as designers are more and more frequently taking advantage of IPs for SoC or ASIC designs. While an average design in the year 2000 might have had less than 20 IPs, the average number of IPs increased to almost 100 per design in the year 2003 and is expected to increase to 500 or more in the year 2006. The percentage of total IC area taken by IP designs is also increasing due to the increasing complexity of IP designs. The difficulty in integrating IPs is exacerbated by the fact that for most designs the majority of the IPs are developed by third party IP developers. The use of third party IPs complicates the task of integration of these IPs into the design because of concern about maintaining confidentiality of information and protecting intellectual property rights and because of different design styles and ad hoc verification of non-standard databooks and delivery packages, often resulting in a failure of third party IPs to meet internal requirements. This often results in additional resources being required to evaluate and validate third party IPs and, in many cases, in-house designers must spend more time verifying an IP than it took to develop in the first place.

Accordingly, SoC and ASIC designers desire to bring in an external or third party IP, assess the IP for compliance with their organization's standards, requirements, and needs, and then integrate the IP into the in-house design flow for further evaluation or analysis before buying or committing to the IP. This process, however, is currently error-prone and ad hoc as SoC and ASIC designers must manually evaluate each IP for compliance with rules, tools, or other organizational requirements, a time-consuming and expensive process. An IP may be required to satisfy both organization standards and industry standards. Industry standards, such as PCI Express, USB On-the-Go, or 10-Gbit/second Ethernet, are well-known and allow IP developers to adapt their IPs to meet these standards. Many of the organization's own standards, however, must be kept confidential and proprietary, making it difficult for third party IP developers to ensure that their IPs conform to the organization's requirements. An organization often desires to keep its internal design and fabrication processes confidential because, among other reasons, publishing requirements for IPs may give competitors insight into upcoming, next-generation products and fabrication capabilities. The resources required to assess and integrate third party IPs, when combined with the dramatic increase in the use of IPs, result in a need to reduce the time and other resources currently used to manually assess and integrate IPs. There is, therefore, a need for an effective and efficient system to assess and integrate silicon IPs into in-house design flows efficiently, cost-effectively, and in a timely and consistent manner.

SUMMARY OF THE INVENTION

The problems identified above are in large part addressed by systems, methods, and media for a schema-based portal for assessment and integration of silicon IPs. One embodiment generally provides a method for managing third party silicon IPs and silicon design. The method may generally include receiving external IP information at an IP portal from a third party via a secure access layer and performing one or more functions on the received IP information (IP specsheet, databook, design filesets, etc.). Embodiments of the method may also include authorizing certain user access privileges and encrypting a message based on an interface protocol and transmitting the encrypted message. The functions may include an IP search, an IP qualification, an IP certification, an IP request, or an IP design data delivery and exchange. The portal interface protocol may include an external interface protocol and an internal interface protocol in some embodiments. An internal user or design system may represent a user or design system that is internal to a company or other organization, within an organization's firewall, within a company's proprietary and secure design environment and IT infrastructure, or otherwise having access to internal design information, while an external user or organization is an entity that does not meet the standard.

Another embodiment provides a machine-accessible and machine-interpretable medium containing instructions that are effective when executed in a data processing system to cause the system to perform a series of operations for managing third party IPs. The series of operations generally includes receiving external IP information at an IP portal from a third party via a secure access layer and performing one or more functions on the received IP information (IP specsheet, databook, design filesets, etc.). Embodiments of the series of operations may also include authorizing certain user access privileges and encrypting a message based on an interface protocol and transmitting the encrypted message. The functions may include an IP search, an IP qualification, an IP certification, an IP request, or an IP design data delivery and exchange. The interface protocol may include an external interface protocol and an internal interface protocol in some embodiments.

A further embodiment provides an IP portal system having a portal interface to receive inputs from one or more users and to provide output to one or more users and a database interface to transmit and receive information to and from a silicon IP database and an IP file system. Embodiments of the system may also include a secure access layer to securely communicate information and an internal interface protocol and an external interface protocol and the secure access layer. The internal interface protocol may authorize and encrypt communications to an internal user or design system within or inside a company's firewall and the external interface protocol may authorize and encrypt communications to an external user or design system outside a company's firewall. The portal interface may be a Web-based interface and schema-based in some embodiments. The secure access layer may include an HTTP tunnel, firewall, or proprietary secure access protocol.

BRIEF DESCRIPTION OF THE DRAWINGS

Advantages of the invention will become apparent upon reading the following detailed description and upon reference to the accompanying drawings in which, like references may indicate similar elements:

FIG. 7A depicts a mode of operation for secure access to design and process rules by third party IP developers according to some embodiments;

FIG. 7B depicts a mode of operation to import a third party IP to an IP portal according to some embodiments;

FIG. 7C depicts a mode of operation for two-way import/export between a third party IP and an IP portal according to some embodiments;

FIG. 8A depicts a mode of operation for a third party IP developer to design and port an IP to an organization's foundry rules and flow from a standard EDA design platform;

FIG. 8B depicts a mode of operation for a third party IP developer to design and port an IP to an organization's ASIC design rules and flow from a standard EDA design platform;

FIG. 9A depicts a mode of operation for internal or external users to utilize functions of an IP portal according to some embodiments;

FIG. 9B depicts a mode of operation for internal or external users to utilize functions of an IP portal with access to one or more third party portals and repositories according to some embodiments.

DETAILED DESCRIPTION OF EMBODIMENTS

Figure 1:
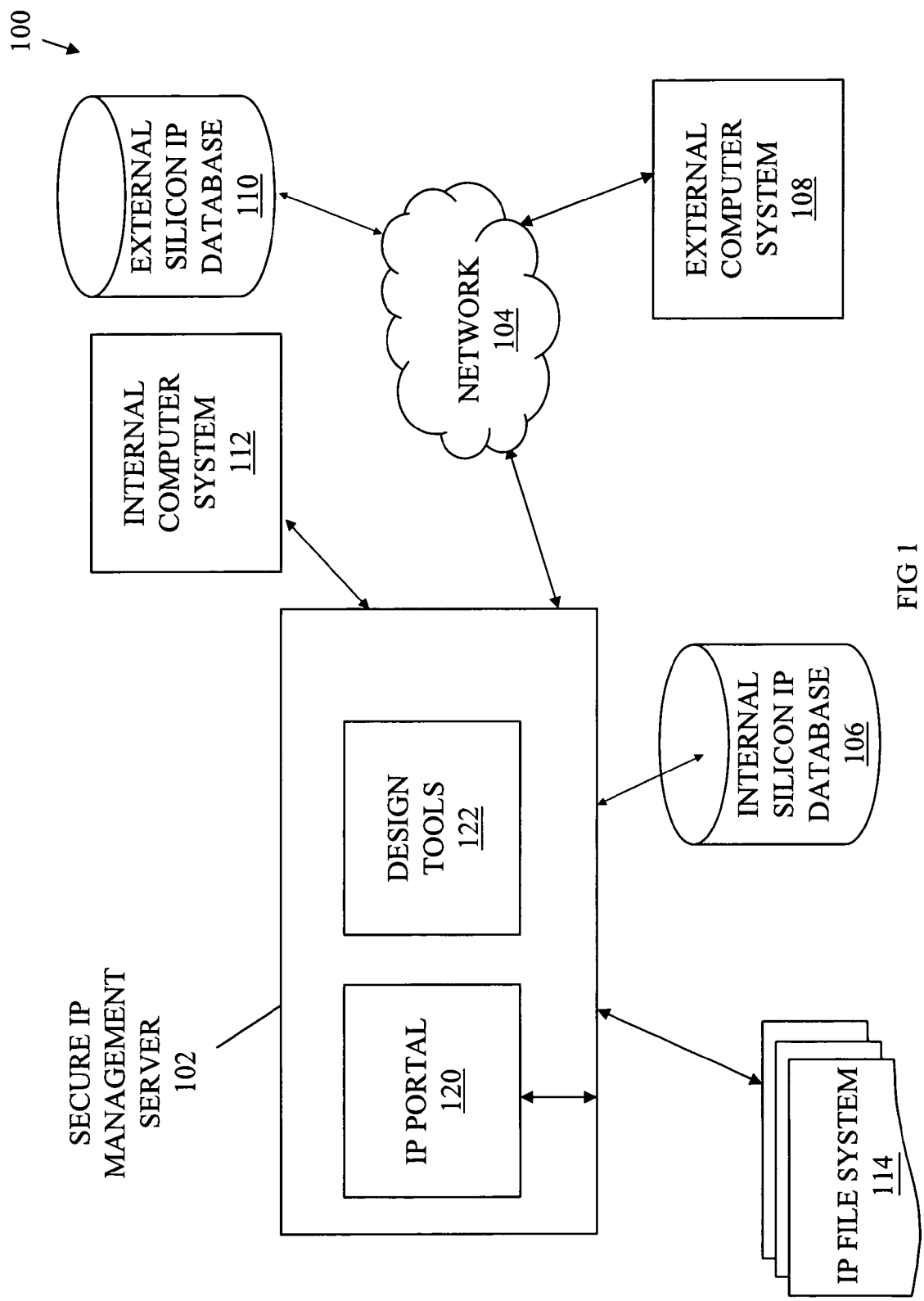
FIG. 1 depicts a schematic view of a silicon IP design and integration environment with a secure IP management server having an IP portal according to one embodiment.

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, systems, methods, and media for a schema-based portal architecture for assessment and integration of silicon IPs are disclosed. Embodiments may generally include an IP portal system having a portal interface to receive inputs from one or more users, design platforms, or IP portals and to provide output to one or more users, design platforms, or IP portals and a database interface to transmit and receive information to and from a silicon IP database and an IP file system. Users as used herein shall include individual users as well as design platforms or IP portals. Embodiments of the system may also include a secure access layer to securely communicate information and an internal interface protocol and an external interface protocol and the secure access layer. The internal interface protocol may authorize and encrypt communications to an internal user or design system and the external interface protocol may authorize and encrypt communications to an external user or design system. An internal user or design system may represent a user or design system that is internal to a company or other organization, within an organization's firewall, within a company's proprietary and secure design environment and IT infrastructure, or otherwise having access to internal design information, while an external user or organization is an entity that does not meet the standard. The portal interface may be a Web-based interface and schema-based in some embodiments. The secure access layer may include an HTTP tunnel, firewall, or proprietary secure access protocol.

The systems, methods, and media of the disclosed embodiments may provide an improved methodology for managing IP assessment and design data exchange for third party IPs and integrating those IPs into an internal design flow. As will be described in more detail subsequently, the disclosed system may provide a flexible and extensible IP portal architecture that provides schema-driven IP submission, IP specification and design flow submission, IP search, IP qualification, IP certification, IP package (i.e., databook, models, rules and other design filesets) export/import, as well as other functions. External third party IP developers may submit IPs for evaluation and assessment and the disclosed embodiments may advantageously convert and import the third party submissions in conformance with internal design rules, tools, etc. Communications with external users may be securely accomplished and dissemination of information may be limited to those users (both external and internal) that are authorized to use the information. In this fashion, the disclosed methodology may provide an efficient and effective mechanism to access and integrate third party IPs with an internal design flow without disclosing proprietary information.

Turning now to the drawings, FIG. 1 depicts a schematic view of a silicon IP design and integration environment with a secure IP management server having an IP portal according to one embodiment. Silicon IP design and integration environment 100 may include a secure IP management server 102 that may provide for assessing and integrating IPs for use in designing SoCs, ASICs, or other ICs. The secure IP management server 102 may be in communication with one or more external silicon IP databases 110 and one or more external computer systems 108 (such as those operated by third party IP developers) via a network 104. The secure IP management server 102 may also be in communication with an internal silicon IP database 106 (for storage of IP specifications and descriptions) and an IP file system 114 (for IP filesets such as design files, rules, and models). Additionally, the secure IP management server 102 may be in communication with one or more internal computer systems 112, such as those operated by employees of the organization operating the secure IP management server 102. As will be described in more detail subsequently, the secure IP management server 102 may advantageously provide a flexible and extensible portal architecture that provides schema-driven IP management. Users (either internal or external) may use an IP portal of the secure IP management server 102 to search for IPs that meet their requirements and that are represented on the internal silicon IP database 106, an external silicon IP database 110, and/or IP file system 114. Third party developers may submit IPs to the secure IP management server 102 via an IP portal for assessment, evaluation and integration into a design flow. The secure IP management server 102 may automatically assess and integrate these submitted IPs in some embodiments so that they may be included in future search results once they have been qualified. The silicon IP design and integration environment 100 may also provide other functions applicable to IPs beyond IP search and submission, such as IP qualification, IP certification, IP specification and design flow submission, or IP package (i.e., databook, models, rules and other design filesets) import/export. For all of these functions, the secure IP management server 102 may provide two levels of security (including a secure access layer and an interface protocol) to protect data in the system by limiting access to data as required and providing a secure system for enforcement of licensing and other legal requirements or agreements.

The secure IP management server 102 of some embodiments may utilize dynamically hot-swappable schema architecture to manage IPs used in the SoC and ASIC designs. Schemas may, among other things, represent a description of the inputs, output, functionality, and interface protocols of an IP, serving as a machine-interpretable meta-data format template with the requirements and data necessary to integrate an IP into a design. A designer (or design tool) may utilize the schema representing an IP to identify the type and format of available design data for an IP so that the IP may be efficiently unpacked, potentially eliminating the need to analyze and guess what has been delivered with an IP and in what format. Schemas may be defined consistent with a standard such as the SPIRIT XML v1.0 standard (or other standard) so that users who know of the standard and portals or portal utilities built upon the standard may quickly ascertain what kind of data is delivered with the IP, the contents and data type of the design files, etc. The disclosed system may in some embodiments utilize a higher-level general description instead of hardcoded schema requirements to advantageously allow the use of any IP schemas, including variations or extensions of schema consistent with the SPIRIT or other standards but differing in structure or content. This may be accomplished by a rule-based analysis, decomposition, and classification of the schema structure and content and dynamic binding of features and schema attributes at run-time and may advantageously allow for the use of any type of IP schema, including those that are different in structure or content than existing standards such as the SPIRIT XML compliant schemas. The disclosed system may provide self-configurable functions, data generators, data collectors, and report generators that are schema-aware, allowing each to work directly from and based on dynamically loaded schema without the schema itself being hardcoded into their definition. One skilled in the art will recognize that the schemas may be in any schema language or format (e.g., XML) now existing or later developed.

In the silicon IP design and integration environment 100, any of the secure IP management server 102, the internal silicon IP database 106, any external computer systems 108, any internal computer systems 112, the external silicon IP database 110, or the IP file system 114 may be located at the same location, such as in the same building or computer lab, or could be remote. While the term "remote" is used with reference to the distance between the components of the silicon IP design and integration environment 100, the term is used in the sense of indicating separation of some sort, rather than in the sense of indicating a large physical distance between the systems. For example, any of the components of the silicon IP design and integration environment 100 may be physically adjacent or located as part of the same computer system in some network arrangements, such as when the secure IP management server 102 and the internal silicon IP database 106 are part of the same computer system. Those skilled in the art will recognize, however, that the invention described herein may be implemented utilizing any type or combination of computer systems.

The secure IP management server 102 (as well as other components of the silicon IP design and integration environment 100) may, in one embodiment, be software implemented on one or more of any type of computer system, including servers, personal computers, workstations, mainframe computers, notebook or laptop computers, desktop computers, or the like. In one example, the secure IP management server 102 may be implemented on an IBM® eServer or similar server having one or more processors, or threads of processors, executing software and/or one or more state machines coupled with data storage devices such as random access memory (RAM), read only memory (ROM), flash memory, compact disk drives, hard drives, and the like. In some embodiments, the secure IP management server 102 may be an application server with an IP portal implemented as a Web-based application accessible by a plurality of users on internal computer systems 112 or external computer systems 108. In this example, the users may utilize a browser executing on the internal computer system 112 or external computer system 108 to interact with the IP portal of the secure IP management server 102. In some embodiments, the browser may be a graphical browser application that allows a user to view Internet or intranet content such as Microsoft Corporation's Internet Explorer™, Netscape Communication Corporation's Navigator™, Mozilla Foundation's Mozilla, Apple Corporation's Safari™, etc.

Network 104 may be any type or combination of data communications channels, such as the Internet, an intranet, a LAN, a WAN, an Ethernet network, a wireless network, a proprietary network, a broadband cable network, or combination thereof. The Internet or other public network may be particularly useful as network 104 when the external computer systems 108 and external silicon IP databases 110 are widely distributed from the secure IP management server 102 as communications between these systems will be facilitated. Similarly, a corporate intranet may serve as network 104 for communications within an internal corporate computing environment. Those skilled in the art will recognize, however, that the invention described herein may be implemented utilizing any type or combination of data communications channel(s).

The external silicon IP databases 110 and the internal silicon IP database 106 may each include one or more databases storing data in any type of database format, such as MySQL, DB2, Oracle, SQL, or other database format. The external silicon IP database 110 may be any public or proprietary database of IPs that may be utilized in conjunction with the secure IP management server 102 to provide additional IPs for use by SoC or ASIC designers. Example external silicon IP databases 110 may include IP repositories such as Virtual Component Exchange Ltd.'s (VCX) Virtual Component Exchange, Design & Reuse Software's (D&R) Web portal, etc., or other public or proprietary repositories or databases. The internal silicon IP database 106 may store a company's own IP specification, design data, or other information for the organization operating the secure IP management server 102. The internal silicon IP database 106 may be in communication with the secure IP management server 102 via a network such as a corporate intranet or the Internet. In some embodiments, users may use the IP portal to search both internal and external IPs by access to the internal silicon IP database 106 and the external silicon IP database 110 by use of the dynamic architecture of the secure IP management server 102. The IP file system 114 (which may be in communication with the secure IP management server 102 via a network such as a corporate intranet or the Internet) may store IP design files, rules, models, testbenches, documents, etc. for IPs that are part of or have been submitted to the IP portal. The IP file system 114 may be implemented on any commercial or proprietary file system such as the UNIX file system UFS, HFS Mac™ OS file system, Windows® NTFS and EFS file systems, etc.

Third party developers or vendors may utilize an external computer system 108 to access the IP portal (such as via a browser) to perform functions such as submitting an IP for evaluation or qualification or collaborative design data delivery as well as to receive results, requests for additional information, etc. As will be described in more detail subsequently, the user of the external computer system 108 may require authentication (e.g., user id and password) for the secure access layer of the secure IP management server 102 and an external interface protocol may limit access of the user to information within the IP portal.

Users that are internal to the organization of the secure IP management server 102 may utilize an internal computer system 112 to access the IP portal of the secure IP management server 102. These users may perform tasks such as IP search, IP request, IP submission, IP certification, or other tasks using the internal computer system 112. In some embodiments, a user may utilize a browser of an internal computer system 112 to access a Web-based IP portal via an intranet network or the Internet. These embodiments may advantageously provide a Web-based and graphical or visual interface accessible by a distributed design team.

The secure IP management server 102 may include an IP portal 120 and one or more SoC, ASIC, or IC design, simulation, verification, characterization, etc. tools 122. The IP portal 120, which is described in more detail in relation to FIG. 2 may provide schema-driven (e.g., XML schema) IP submission, IP specification and design flow submission, IP search, IP qualification, IP certification, IP package import/export or other functions for internal and/or external users. The IP portal 120 may provide for both secure and licensable access to organizational rules, flows, and other information to third party developers as well as providing secure and restrictable access to third party IPs, organizational requirements. Using the IP portal 120 and the secure IP management server 102, an external IP vendor (third party IP developer) may be granted access to an organization's rules, models, generators, and utilities on a secure and customizable basis, facilitating submission and evaluation of third party IPs. The SoC, ASIC, or IC design tools 120 may include tools for IP-based design and integration such as Mentor Graphics® Corporation's Platform Express™ tools or Synopsys® Corporation's DesignWare® tools, as well as any other publicly-available or proprietary tools.

Figure 2:
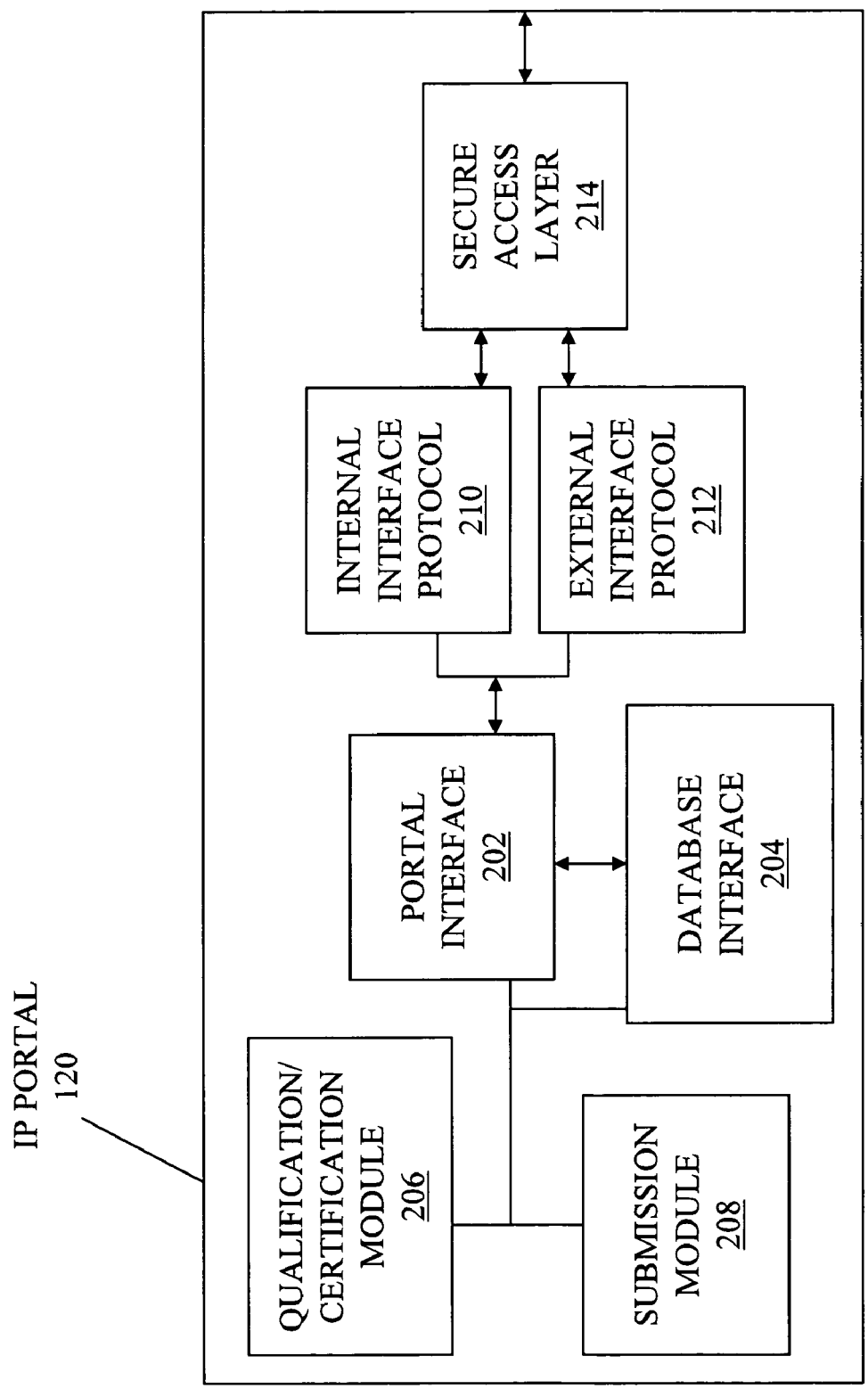
FIG. 2 depicts a conceptual illustration of software components of the IP portal of FIG. 1 according to one embodiment.

FIG. 2 depicts a conceptual illustration of software components of the IP portal of FIG. 1 according to one embodiment. In the disclosed embodiment, the IP portal 120 includes a portal interface 202, a database interface 204, a qualification/certification module 206, a submission module 208, an internal interface protocol 210, an external interface protocol 212, and a secure access layer 214. The portal interface 202 may, in some embodiments, provide a Web-based or other graphical user interface to users interacting with the IP portal 120. In these embodiments, the portal interface 202 may function as an application server while Web browsers of the internal computer systems 112 and/or and external computer systems 108 function as clients. Users of the internal computer systems 112 and/or external computer systems 108 may provide input and receive output via any mechanisms or methodologies for receiving input (e.g., keyboard, mouse, user interface, voice command, etc.) or providing output (e.g., display, audio output, printouts, etc.). As will be described in more detail subsequently, the portal interface 202 may communicate with other computer systems through the secure access layer 214 and/or one of the interface protocols. The database interface 204 may transmit and receive information between the IP portal 120 and the internal silicon IP database 106 and/or IP file system 114.

The qualification/certification module 206 may provide for qualification and/or certification of IPs submitted and processed by the submission module 208. Internal IP developers or IP acquisition teams, as well as external third party IP developers, may submit IPs via the portal interface 202 for processing by the submission module 208. The submission module 208 may receive a submitted IP, process any information submitted with the IP, and may store the submitted IP and associated information. The qualification and certification performed by the qualification/certification module 206 on submitted IPs (or the requalification of existing or changed IPs) may include evaluation and assessment of the IP package for conformance with, for example, the organization's ASIC and SoC methodologies and flows.

The secure access layer 214 may be a firewall, HTTP tunnel, or a proprietary secure access protocol such as IBM®'s Customer Connect suite of e-business tools and resources for collaboration between partners. A user may, in some embodiments, provide authentication such as a password or user id to achieve access to information behind the secure access layer 214. The secure access layer 214 may accordingly provide one layer of security between the IP portal 120 and outside systems such as internal computer systems 112 or external computer system 108 so as to protect information within the IP portal 120. The internal interface protocol 210 and/or the external interface protocol 212 may provide an additional custom or standard protocol layer of protection for IP portal 120 information by regulating access by internal computer systems 112 or external computer systems 108, respectively. The interface protocols may serve as access management protocols and may authorize users, encrypt information, and ensure that only the appropriate information is received by users based on licensing or other agreements. The internal interface protocol 210, for example, may ensure that internal users are only provided information for which they need access, allowing for IP information to be controlled at an individual, process or group level. The external interface protocol 212, in another example, may allow a third party IP developer access to only the rules, generators, models, and utilities that are authorized under its contract with the organization. As described in more detail in relation to FIG. 3, the secure access layer 214 and the interface protocols may thus provide two layers of flexible protection for information in the IP portal.

Figure 3:
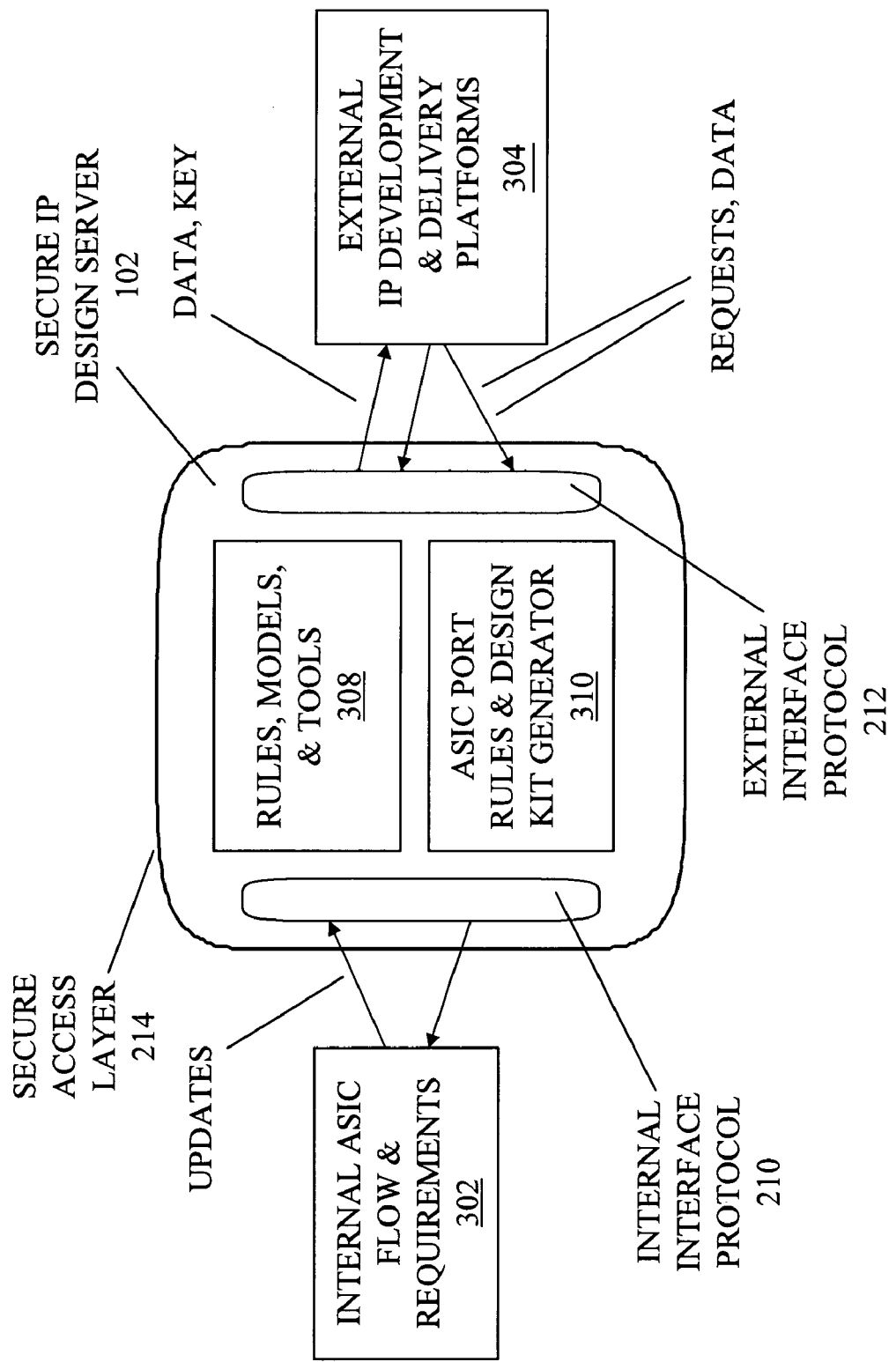
FIG. 3 depicts a functional block diagram representing the architecture and operation of the secure IP management server according to one embodiment.

FIG. 3 depicts a functional block diagram representing the architecture and operation of the secure IP management server according to one embodiment. The secure IP design server 102 of FIG. 3 may include a secure access layer 214 (such as a corporate firewall) as well as an internal interface protocol 210 (for communications with members of the company or other organization, such as a division or group firewall) and external interface protocol 212 (such as IBM®'s Customer Connect for communication with external customers or partners) based on licensing agreements and/or legal considerations, as described in relation to FIG. 2. Within the disclosed secure IP design server 102 is a rules, models, and tools 308 and an ASIC port rules and design kit generator 310. The rules, model, and tools 308 may include ASIC rules (e.g., timing, extraction, corner simulation, etc.), circuit models, tools, utilities, or other organization IP data and may provide access to such data, tools, and utilities to external or internal users as appropriate. The ASIC port rules and design kit generator 310 may include proprietary rules and utilities (e.g., design rule generators, design kits, etc.) to generate design kits and manufacturing rules from the IP design data filesets.

An external user may use an external IP development and delivery platform 304 (such as an external computer system 108) to present an IP to the secure IP design server 102 for assessment and evaluation. The external IP development and delivery platforms 304 may either submit data (such as an IP package) one-way to the secure IP design server 102 (i.e., customers who may submit but have no access to tool) or may have a two-way connection to facilitate exchange of data, requests and results, return of an encryption key, etc. The external IP development and delivery platforms 304 may connect to the secure IP design server 102 by a secure access layer 214. In some embodiments, different external IP development and delivery platforms 304 may have different external interface protocols 212 that they each use to access the secure IP design server 102. Accordingly, communications may also have to pass through a specific external interface protocol 212 in addition to the secure access layer 214 so that customers or other users may be restricted to accessing only certain data based on their contractual arrangement, needs, etc. Thus, external users who gain access to the secure IP design server 102 are advantageously limited to access of data or information for which they are authorized via 212. In this fashion, organization rules, generators, models, and utilities may be kept proprietary and only disclosed as necessary and authorized. Moreover, information transmitted to the external user may be encrypted with a unique key in addition to being authorized for that user.

Similarly, an internal user may be limited as to which of the internal ASIC flow and requirements 302 to which they will have access via the internal interface protocol 210. Many organizations may desire to limit access to third party IP design data and rules to particular groups or organizations. The internal interface protocol 210 may facilitate control of data to internal users, such as those on internal computer systems 112. In some embodiments, the internal interface protocol 210 may also provide IP license management by limiting access to various third party IPs based on the identity of that individual or group, such as when an IP is licensed only for particular users, groups, or purposes or when third party IPs are licensed by a customer for a product being developed for that customer and not for use by the company providing design and/or fabrication services.

Figure 4:
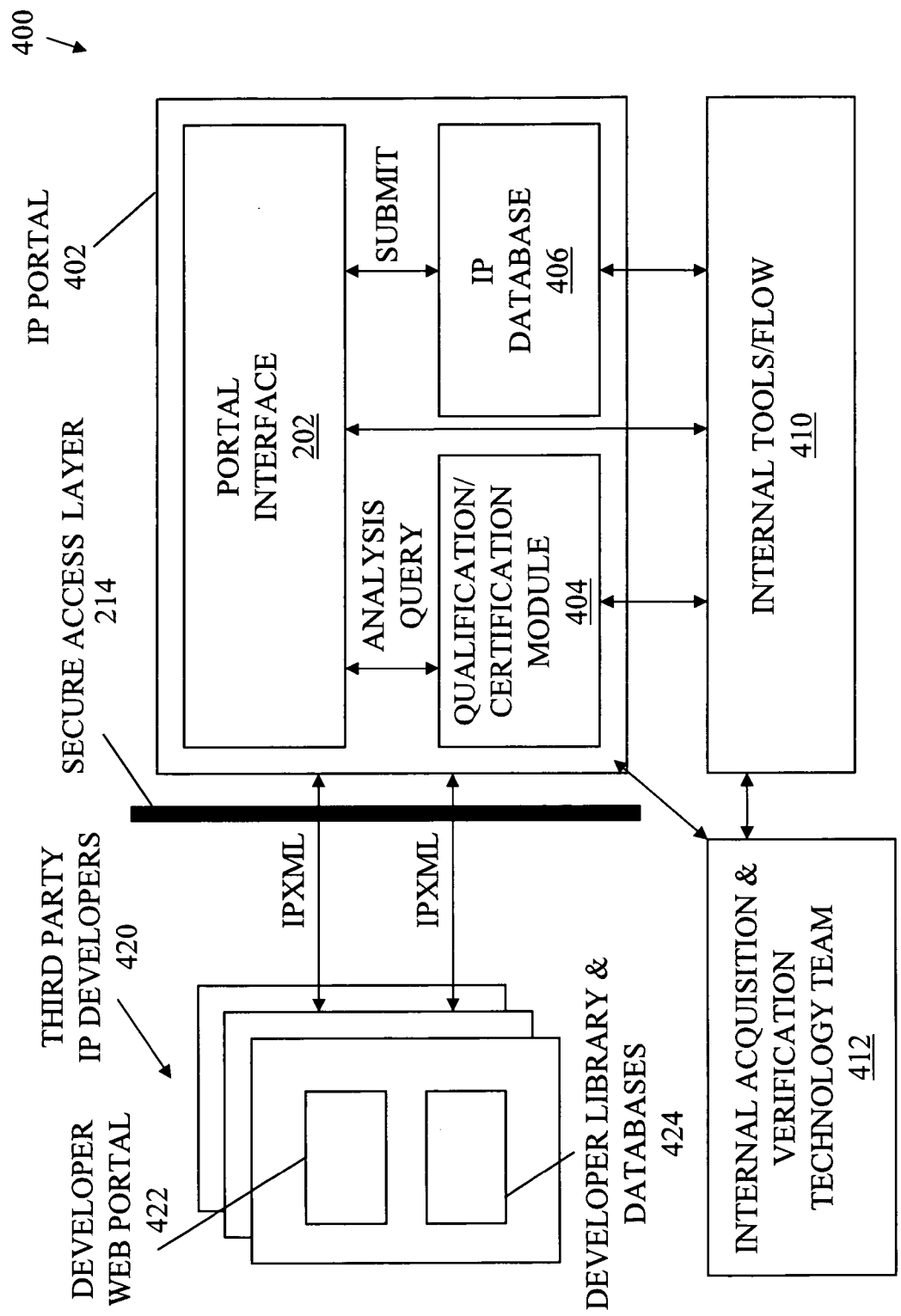
FIG. 4 depicts a schematic view of a configuration for IP integration with an in-house (internal) design flow according to some embodiments.

FIG. 4 depicts a schematic view of a configuration for IP integration with an in-house (internal) design flow according to some embodiments. In the embodiment of FIG. 4, the IP design environment 400 includes an IP portal 402 in an internal in-house use mode to provide automatic access, qualification, and transfer of internal IPs (from an internal IP database 406) or external IPs (from third party IP developers 420 or external portals) to an internal design, verification, and characterization flow. Third party IP developer 420 resources may include a developers Web portal 422 or developer library and databases 424. The internal user may thus use the IP portal 402 to bring in IPs from the third party IP developer 420 resources as well as internal sources and pass those IPs to the internal design tools.

An internal user (e.g., a designer, architect, field application engineer, etc.) may generate a request for a desired IP via a Web-based portal interface 202. The IP portal 402 may then generate a search token and broadcast it to external IP portals or third party IP developer partner search APIs. The IP portal 402 may also apply the search token against the internal IP database 406. In this fashion, a user may advantageously access both external repositories and internal tools with one search. The IP portal 402 may receive search results, which may include matched IPs (full or partial matches) that are ranked based on the initial IP request profile. Communication between the IP portal 402 and third party IP developers 420 may be schema-based (e.g., via XML Schema). The IP portal 402 may then generate IP profiles and data packages for those matched IPs and IP qualification rules may then be applied by the qualification/certification module 404. Qualification may also include the assistance of an internal acquisition and verification technology team 412 as required. Qualified IPs may then be presented to the requesting user.

The user may select IPs from the search results that include qualified IPs, and selected IPs may be checked in to the internal design flow represented by the internal tools/flow 410. If any of the design data or rules are missing or corrupted, a list of these problems may be generated and forwarded to the provider of the IP. The internal mode of operation of FIG. 4 may thus allow for automated integration of IPs from both external and internal sources into an internal design flow. The mode of operation of IP design environment 400 may advantageously allow a user to bring in external IPs and pass them to internal design tools (i.e., internal tools/flow 410). An internal user may, for example, search for an IP that meets their requirements, see the results of the search including qualified IPs, assess and analyze one or more of the IPs, and potentially even purchase an evaluation license for their selected IP, allowing the IP to be integrated into their design flow.

Figure 5:
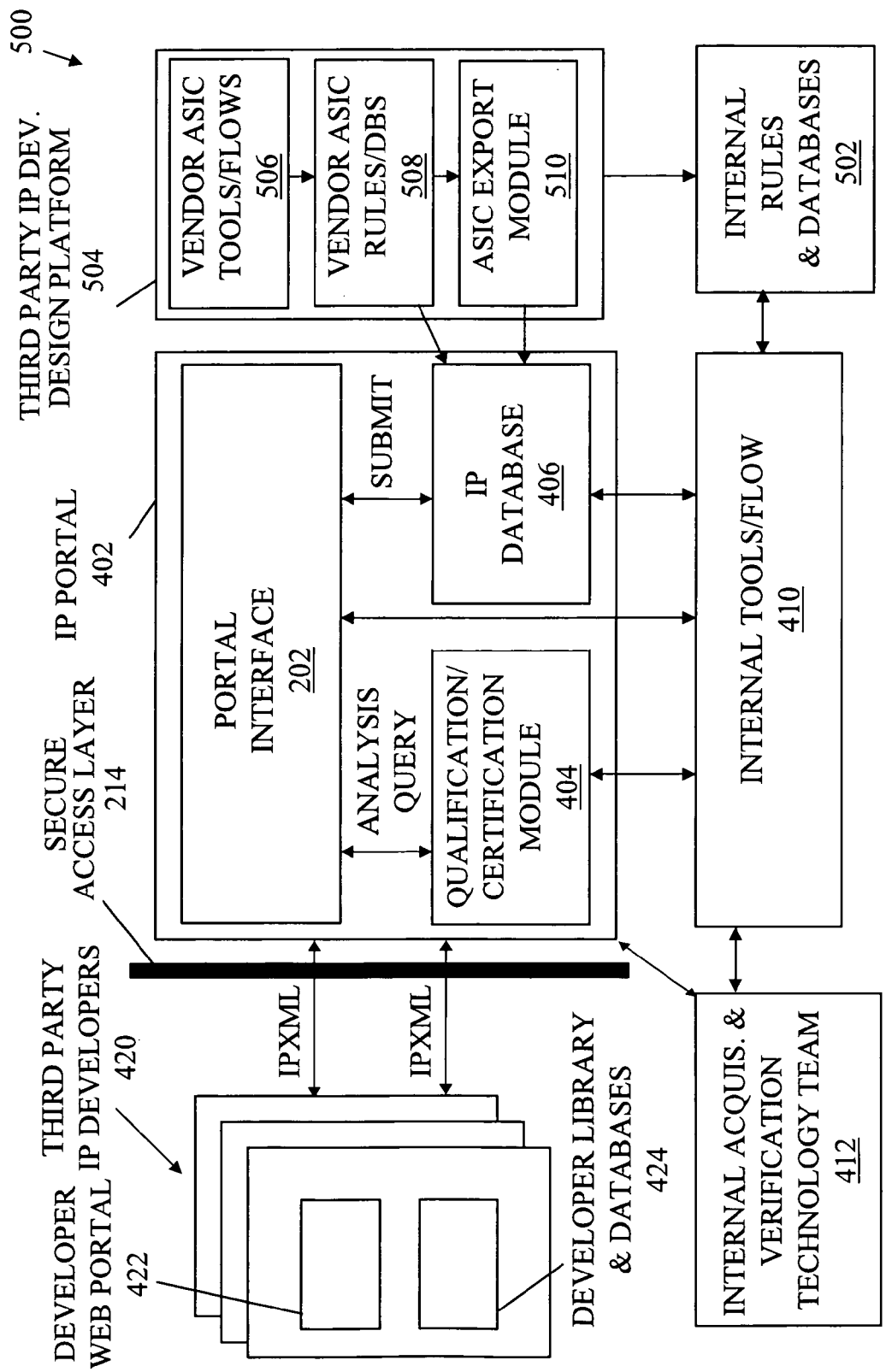
FIG. 5 depicts a schematic view of a configuration for integration of external design platforms with an in-house design flow according to some embodiments.

FIG. 5 depicts a schematic view of a configuration for integration of external design platforms with an in-house design flow according to some embodiments. The embodiment of FIG. 5 includes an IP design environment 500 that builds upon the design environment of FIG. 4 and the description of common components and operations will not be repeated in the interest of brevity. IP design environment 500 includes a third party IP developer design platform 504 in communication with the IP portal 402. The third party IP developer design platform 504 may be any design platform, including industry standard design platforms such as those in Cadence® Design System, Inc.'s OpenChoice program or those platforms from Mentor Graphics® Corporation, Synopsys® Corporation, or other vendors. Users may use the third party IP developer design platform 504 to design and generate company-specific design rules and filesets of their IP design directly from the vendor design environment.

To design and generate company- or foundry-specific design rules and filesets from the vendor design environment, the user may generate their design using vendor ASIC tools/flows 506 using their normal methodologies. Using these tools, the user may generate vendor ASIC rules/databases 508 that may be passed to the IP portal 402. The vendor design and rules may be passed to the IP portal 402 for evaluation or use after conversion and encryption by the ASIC export module 510. The ASIC export module 510 may generate the required rules, models, and files and export them to the company's internal databases 502 for use in the design environment or may pass them to the IP portal 402 for a more detailed evaluation or other processing. The ASIC export module 510 may be an encrypted 'black box' for a company's IP portal 402 that is within the third party IP developer design platform 504. The design and process rules may be provided as an encrypted option from within the vendor tools, allowing a user to effectively save their design in the appropriate format for the IP portal 402 or the company's specific rules and databases 502. The user has no access (and has no need for such access) to the proprietary rules and utilities provided in the ASIC export module 510 from within the third party IP developer design platform 504. The organization controlling the IP portal 402 may provide the ASIC export modules 510 to different providers of third party IP developer design platforms 504 so that internal or external users using standard design tools can effectively export their designs to the IP portal 402 and the company's internal tools/flow 410 for further evaluation or processing.

Figure 6:
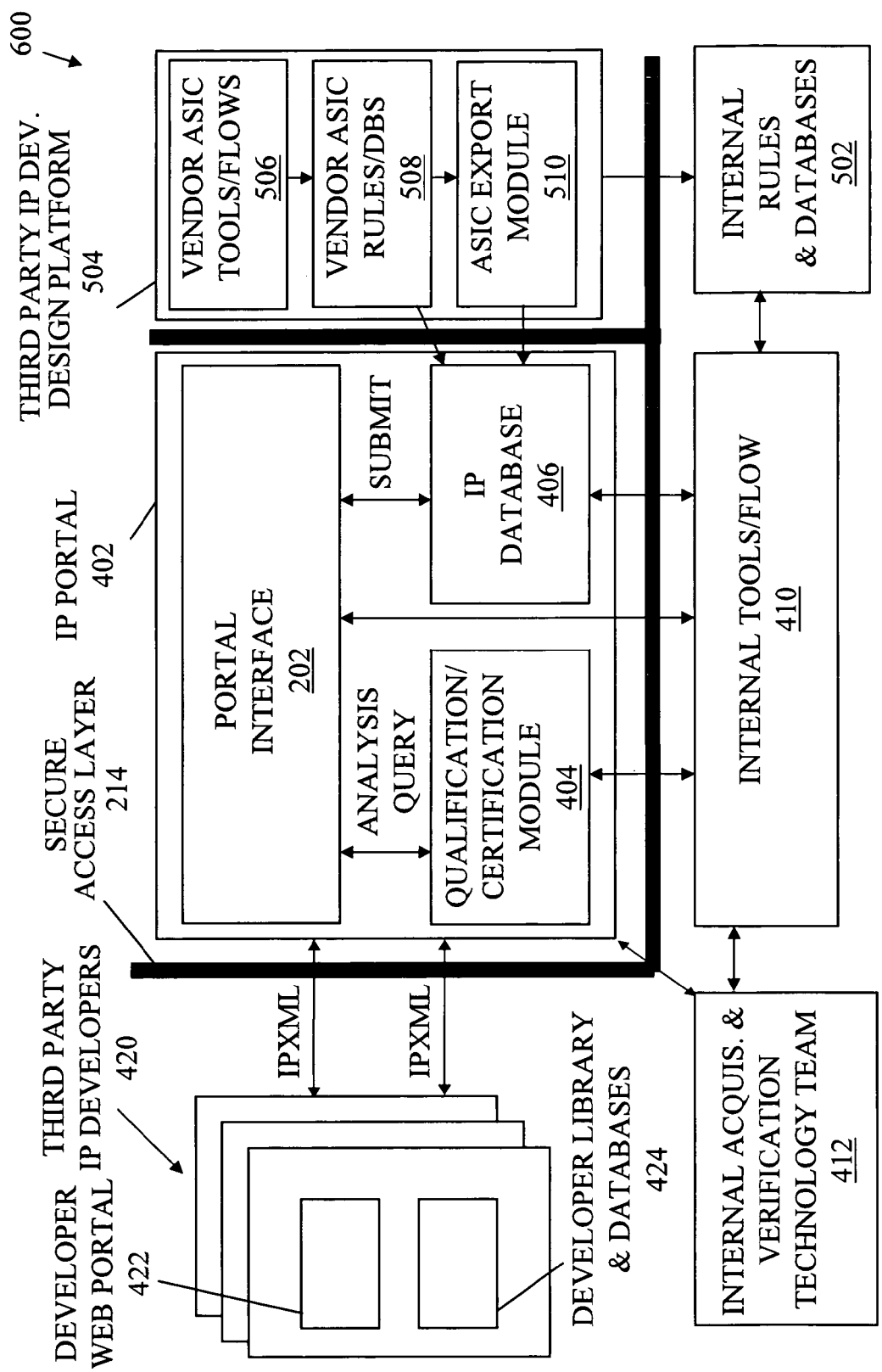
FIG. 6 depicts a schematic view of a secure mode configuration for the configurations of FIGS. 4 and 5 according to some embodiments.

FIG. 6 depicts a schematic view of a secure mode configuration for the configurations of FIGS. 4 and 5 according to some embodiments. The embodiment of FIG. 6 includes secure IP design environment 600 that builds upon the design environments of FIG. 4 and FIG. 5, and the description of common components and operations will not be repeated in the interest of brevity. Secure IP design and integration environment 600 includes a secure access layer 214 (as described in relation to FIG. 2) between the IP portal 402 and the third party IP developer design platform 504, providing a secure transfer channel in between the IP portal 402 and the third party IP developer design platform 504. The secure transfer of the secure access layer 214 may provide an additional level of security over the encryption and control of the ASIC export module 510. Similarly, the secure access layer 214 may also extend between the internal rules and databases 502 and the third party IP developer design platform 504 and provide a similar additional layer of protection.

The secure IP design and integration environment 600 of FIG. 6 may allow certified third party IP developers to submit IPs based on broadcasted requests and to stay involved with IP qualification and refinement as well as design data (e.g., HDL, testbench, GDL, simulation modules, etc.) submission. In addition, certified design shops and IP developers may design IPs using industry standard design platforms (that support the ASIC export module 510) and directly submit to the internal organizational design flow to generate corresponding design kits (e.g., preliminary design kit "PDK", final design kit "FDK", certified design kit "CDK", etc.).

FIGS. 7A-7C depict schematic views of different modes of operation of the silicon IP design and integration environment according to some embodiments. FIG. 7A depicts a mode of operation for secure access to design and process rules by third party IP developers according to some embodiments. In FIG. 7A, an external user may utilize third party IP developers delivery standards 706 to convert their design to a customer's internal design and process requirements based on encrypted (black-box) generators as described in relation to FIGS. 5 and 6. The import/export rules/tools/utilities 704 may serve as the encrypted generators and may include rules such as timing, parasitic extraction, circuit simulation, or other rules and requirements as well as proprietary tools and utilities to generate design and manufacturing rules (e.g., design kits). The import/export rules/tools/utilities 704 may convert the third party IP design package to meet internal ASIC IP requirements 702.

FIG. 7B depicts a mode of operation to import a third party IP to an IP portal according to some embodiments. In the mode of operation of FIG. 7B, the external user may utilize third party IP developers delivery standards 706 to convert their design to a customer's internal design and process requirements based on encrypted (black-box) generators as described in relation to FIGS. 5 and 6. The import/export rules/tools/utilities 704 may serve as the encrypted generators and may include rules such as timing, parasitic extraction, circuit simulation, or other rules and requirements as well as proprietary tools and utilities to generate design and manufacturing rules (e.g., design kits). The import/export rules/tools/utilities 704 may convert the third party IP design package to meet both internal ASIC IP requirements 702 as well as those of an internal or organizational silicon foundry 708 (i.e., chip fabrication facility). The internal foundry 708 and internal ASIC IP requirements 702 may be located behind the IP portal firewall and may facilitate design, verification, or characterization tasks after delivery of an IP from a third party. The automated porting and conversion of the import/export rules/tools/utilities 704 may save significant resources when compared to individuals having to manually process, evaluate, and verify imported third party IPs.

FIG. 7C depicts a mode of operation for two-way import/export between a third party IP and an IP portal according to some embodiments. In the mode of operation of FIG. 7C, the external user may submit third party IPs in the same fashion as described in relation to FIG. 7B, which will not be repeated in the interest of brevity. The mode of operation of FIG. 7C, however, may also provide for interaction from internal users through the import/export rules/tools/utilities 704 to the third party IP developers. This may facilitate collaboration between external and internal partners to co-design or otherwise collaborate on IP designs. External design partners 710 may thus submit IP design information packages and receive feedback from internal users. Internal users may receive IP information packages from external developers and interactively collaborate with those developers. Communications may be maintained through the IP portal so that the import/export rules/tools/utilities 704 may serve as a 'black-box' for converting information between the external and internal users. The embodiment of FIG. 7C may also provide for export of an internal IP to partners or other IP developers, customers, etc.

FIGS. 8A and 8B depict modes of operation for a third party IP developer to design and port an IP to a company or a foundry via the IP portal. FIG. 8A depicts a mode of operation for a third party IP developer to design and port an IP to an organization's foundry rules and flow from a standard EDA design platform. As described in the configuration of FIG. 5, a third party IP developer design platform 504 may be any design platform, including industry standard design platforms such as those from Cadence® Design Systems, Inc., Synopsys® Corporation, Mentor Graphics® Corporation, etc. A third party IP developer may first generate their design using vendor ASIC tools/flows 506 using their normal methodologies. Using these tools, the user may generate vendor ASIC rules/databases 508 that may be passed to the IP portal 402. The vendor design and rules may be passed to the IP portal 402 for evaluation or use after conversion and encryption by the foundry port module 804. The foundry port module 804 may generate the required rules and models and export them to the internal ASIC library 806 through the IP portal 402 for use in the design environment. The foundry port module 804 may serve as an encrypted 'black box' for the IP portal 402 that is within the third party IP developer design platform 504. The design and process rules may be provided as an encrypted option from within the standard tools, allowing a user to effectively save their design in the appropriate format for the IP portal 402.

FIG. 8B depicts a mode of operation for a third party IP developer to design and port an IP to an organization's ASIC design rules and flow from a standard EDA design platform. As compared to the mode of operation of FIG. 8A, the user in FIG. 8B may be porting a designed IP to an organization's ASIC design rules and flow instead of a foundry. The user may use any third party IP developer design platform 504 to generate their design using vendor ASIC tools/flows 506 using their normal methodologies. Using these tools, the user may generate vendor ASIC rules/databases 508 that may be passed to an internal silicon IP database 808 of the IP portal 402. The vendor design and rules may be passed to the IP portal 402 for evaluation or use after conversion and encryption by the ASIC port module 812. The ASIC port module 812 may port (save as) the IP designs and packages into the internal ASIC flow/models/rules/databases for assessment, evaluation, characterization, or other tasks as part of the internal tools/flow 810. The user may also perform some of the design tasks or design checks using a company's internal tools and rules remotely in a batch mode via 812. This embodiment may be particularly useful when additional tools are required to process the received IP packaging data that are beyond the capabilities of the ASIC port module 812. For example, the 'black-box' of the third party IP developer design platform 504 may be out of date and not reflect the most recent internal rules, models, etc. In another example, an organization may not wish to provide certain internal rules, models, etc. outside the IP portal even when protected in the 'black-box', such as for particularly sensitive design and fabrication information or tasks that require a company's own experts' tweaking or expertise.

FIGS. 9A and 9B depict modes of operation for use of an IP portal. FIG. 9A depicts a mode of operation for internal or external users to utilize functions of an IP portal according to some embodiments. The IP portal 402 of FIG. 9A may support IP request, IP submission, and IP qualification for organizational users. As described previously, a user may interact with the IP portal 402 via the Web-based portal interface 202. In some embodiments, any user may access the portal interface 202 for searching or submission purposes, providing a one-stop option for searching for IPs. In other embodiments, only users with a user id and password for the secure access layer 214 may have access to the functions of the IP portal 402.

FIG. 9B depicts a mode of operation for internal or external users to utilize functions of an IP portal with access to one or more third party portals and repositories according to some embodiments. The mode of operation of FIG. 9B provides schema-based interaction with one or more third party IP developers 420 and their developer Web portals 422 and/or repositories such as developer libraries and databases 424. The disclosed configuration allows for modes of operation that include searching across both internal and external IP databases and third party IP provider candidate list generation for a qualified request. In another mode of operation (particularly with a secure access layer 214), the modes of operation may include IP design data delivery and exchange via standard, modularized, secured schema-based (e.g., XML) data delivery and exchange. In this mode of operation, a third party IP developer may submit an IP specification and design flow information to the IP portal 402. This information may be passively qualified by the qualification/certification module 404 and, after evaluation, missing information may be identified or suggested improvements to the submission may be suggested. The third party submitter may edit, update, or resubmit the IP profile and may also submit IP data/rules/models documents for active qualification. The qualification/certification module 404 may evaluate the submission, cross-check against the IP profile, and submit the package to a Technology team for final qualification. The Technology team may perform analysis and qualification that is unsuitable for automation.

Figure 10:
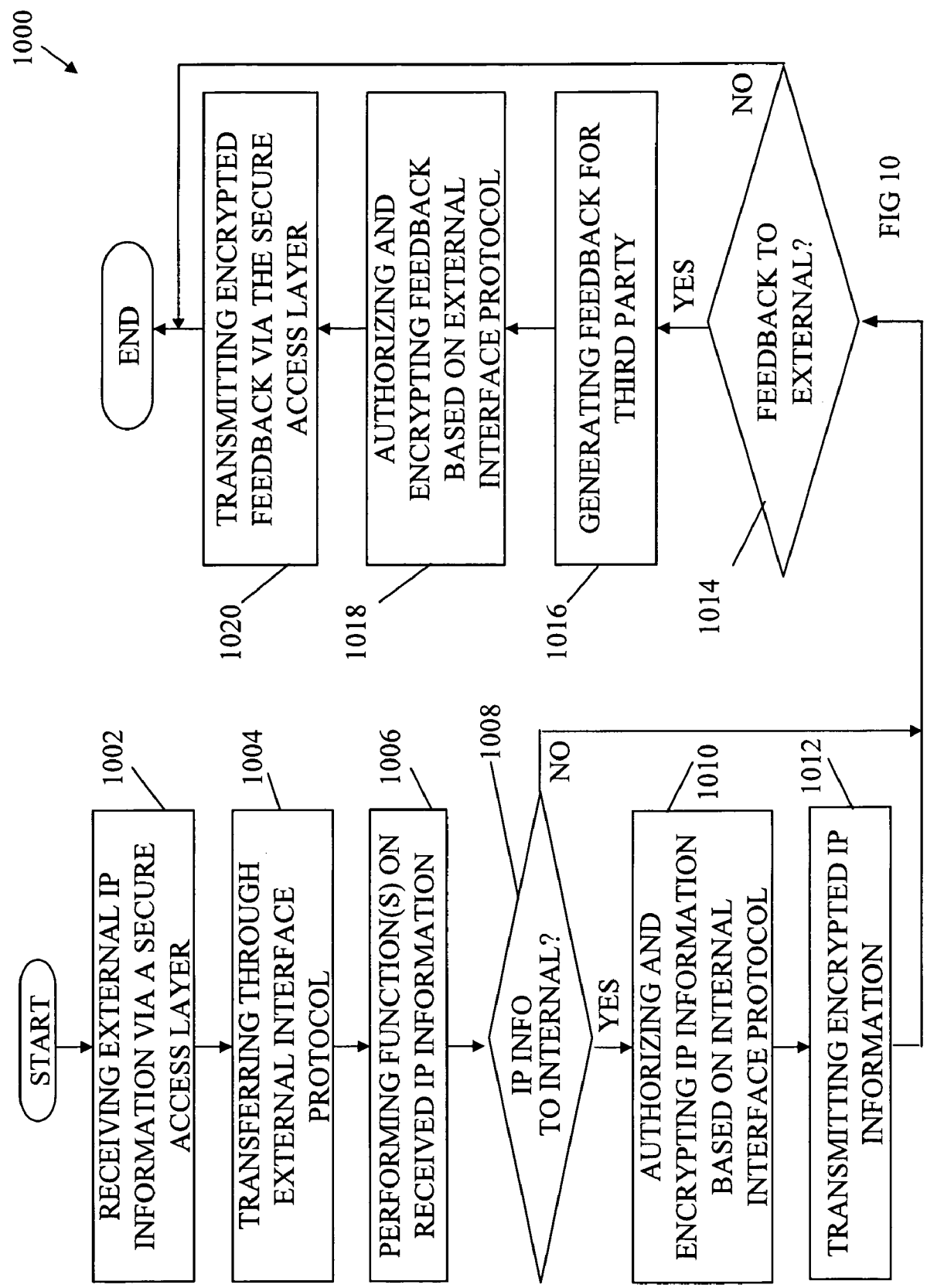
FIG. 10 depicts an example of a flow chart for receiving and transmitting information to and from an IP portal according to some embodiments.

FIG. 10 depicts an example of a flow chart for receiving and transmitting information to and from an IP portal according to some embodiments. The method of flow chart 1000 may be performed, in one example, by one or more components of the IP portal 120. Flow chart 1000 begins at element 1002, receiving external IP information via a secure access layer 214. In some embodiments, the secure access layer 214 may receive IP information from an external computer system 108 after receiving authentication in the form of a user id and/or password (or other authentication information). The IP information may include IP design rules, models, and fileset information. The IP information may also be transferred through the external interface protocol 212 at element 1004. At element 1006, one or more components of the IP portal 120 may then perform functions on the received IP information, including storing some or all in an internal silicon IP database 106, performing IP qualification, IP certification, an IP search, an IP request, IP design data delivery and exchange, or other digital or analog design and analysis functions.

The method of flow chart 1000 may also provide information to users internal to the organization operating the IP portal 120. At decision block 1008, the IP portal 120 may determine whether any IP information needs to be transmitted to internal users, such as when internal users or groups are the intended recipients of third party IP information. If there are internal recipients, the method of flow chart 1000 may continue to element 1010 where the IP portal may authorize and encrypt some or all of the IP information based on the internal interface protocol 210. The internal interface protocol 210 may limit dissemination of information to particular users or groups, such as when only particular users or groups have authorization to access the information based on the IP licensing agreements or other factors. The IP portal 120 may transmit the authorized and encrypted IP information to the authorized users at element 1012.

The method of flow chart 1000 may also return feedback or other information to the originating external user. At decision block 1014, the IP portal 120 may determine whether any feedback or other information will be sent to the third party requesting user. If so, the IP portal may generate any feedback for the third party at element 1016 and may authorize and encrypt the feedback based on the external interface protocol 212 at element 1018. The encrypted feedback may be transmitted to the third party vendor via the secure access layer 214 at element 1020, after which the method terminates. The external interface protocol 212 may limit the information available to the third party based on contractual relations, level of authorization, etc. For example, some third parties may not be authorized to receive communication and the external interface protocol 212 may limit transmittals to those third parties, while other third parties may be authorized to receive final evaluation information for their IPs and the external interface protocol 212 may remove unauthorized information from the feedback. In this fashion, the information that is passed to a third party may be controlled in its content (via the external interface protocol 212) as well as being secured by a secure access layer 214. Different third party partners may have different permissions in the external interface protocol 212 as to what information or rights that they have for the IP portal 120.

Each software program described herein may be operated on any type of computer, such as a personal computer, server, etc. Any program may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates systems, methods, and media for portal-based assessment and integration of silicon IPs. It is understood that the form of the invention shown and described in the detailed description and the drawings are to be taken merely as examples. It is intended that the following claims be interpreted broadly to embrace all the variations of the example embodiments disclosed.

What is claimed is:

1. A computer-implemented method for managing evaluation of third party silicon intellectual properties (IPs) and integration of the IPs into a chip design, the method comprising:

receiving directly from a third party IP vendor at a Web-based IP portal;

executing on one or more processors, external IP information associated with a third party IP from the third party IP vendor via a secure access layer, the external IP information comprising a design and functional specification associated with a third party silicon IP of the third party IP vendor;

automatically converting by the IP portal the received external IP design and functional specification to a schema describing inputs, outputs, available design files and languages, design rule checker reports, EDA platforms used for design and validation, and interface protocols of the third party IP without disclosing proprietary information about internal company chip design requirements to the third party IP vendor, the schema having a specified dynamic format consistent with the internal design requirements and utilizing a hardware description language (HDL);

wherein automatically converting the received external IP design and functional specification to the schema comprises analyzing the design and functional specification using rule-based analysis, decomposing, and classifying a structure of the schema, and wherein automatically converting the received external IP information to the schema further comprises dynamically binding IP features and schema attributes at runtime during the analysis of the third party IP;

qualifying by the IP portal the received external IP information received directly from the third party IP vendor as a third party IP submission in conformance with the internal company chip design requirements;

performing by the IP portal one or more functions on the received IP information;

authorizing by the IP portal user access privileges and encrypting a message based on an interface protocol; and transmitting by the IP portal the encrypted message.

2. The method of claim 1, further comprising generating by the IP portal feedback to the third party to be included in the transmitted message.

3. The method of claim 1, wherein the one or more functions include one or more of an IP search, an IP qualification, an IP certification, an IP request, or an IP design data delivery and exchange.

4. The method of claim 1, wherein receiving external IP information at the IP portal comprises receiving IP information from an external EDA design environment.

5. The method of claim 1, wherein the message comprises one or more information relating to sharing silicon IP design tasks between internal users and the third party, information relating to co-design of a silicon IP design, or design information.

6. The method of claim 1, wherein the interface protocol is an external interface protocol, and wherein further the encrypted message is transmitted to the third party.

7. The method of claim 1, wherein the interface protocol is an internal interface protocol, and wherein further the encrypted message is transmitted to an internal user.

8. A non-transitory, computer-readable storage medium containing instructions effective, when executing in a data processing system, to cause said data processing system to perform operations to manage evaluation of third party silicon (IPs) and integration of the IPs into a chip design, the operations comprising:

receiving directly from a third party IP vendor at a Web-based IP portal executing on one or more processors, external IP information associated with a third party IP from the third party IP vendor via a secure access layer, the external IP information comprising a design and functional specification associated with a third party silicon IP of the third party IP vendor;

automatically converting by the IP portal the received external IP design and functional specification to a schema describing inputs, outputs, available design files and languages, design rule checker reports, EDA platforms used for design and validation, and interface protocols of the third party IP without disclosing proprietary information about internal company chip design requirements to the third party IP vendor, the schema having a specified dynamic format consistent with the internal design requirements and utilizing a hardware description language (HDL);

wherein automatically converting the received external IP design and functional specification to the schema comprises analyzing the design and functional specification using rule-based analysis, decomposing, and classifying a structure of the schema, and wherein automatically converting the received external IP information to the schema further comprises dynamically binding IP features and schema attributes at runtime during the analysis of the third party IP;

qualifying by the IP portal the received external IP information received directly from the third party IP vendor as a third party IP submission in conformance with the internal company chip design requirements;

performing by the IP portal one or more functions on the received IP information;

authorizing by the IP portal user access privileges and encrypting a message based on an interface protocol; and transmitting by the IP portal the encrypted message.

9. The non-transitory, computer-readable storage medium of claim 8, further comprising generating by the IP portal feedback to the third party to be included in the transmitted message.

10. The non-transitory, computer-readable storage medium of claim 8, wherein the one or more functions include one or more of an IP search, an IP qualification, an IP certification, an IP request, or an IP design data delivery and exchange.

11. The non-transitory, computer-readable storage medium of claim 8, wherein receiving external IP information at the IP portal comprises receiving IP information from an external EDA design environment.

12. The non-transitory, computer-readable storage medium of claim 8, wherein the message comprises one or more information relating to sharing silicon IP design tasks between internal users and the third party, information relating to co-design of a silicon IP design, or design information.

13. The non-transitory, computer-readable storage medium of claim 8, wherein the interface protocol is an external interface protocol, and wherein further the encrypted message is transmitted to the third party.

14. The non-transitory, computer-readable storage medium of claim 8, wherein the interface protocol is an internal interface protocol, and wherein further the encrypted message is transmitted to an internal user.

15. An IP portal system having one or more processors to execute software modules to manage evaluation of third party silicon intellectual properties (IPs) and integration of the IPs into a chip design, the system comprising:

a Web-based portal interface to receive inputs from one or more users and to provide output to one or more users;

a database interface to transmit and receive information to and from a silicon IP database and a IP file system;

a secure access layer, wherein the secure access layer is adapted to securely communicate information;

an IP submission module to receive external IP information associated with a third party IP directly from a third party IP vendor via the secure access layer, the external IP information comprising a design and functional specification associated with a third party silicon IP of the third party IP vendor;

wherein the IP submission module automatically converts the received external IP design and functional specification to a schema describing inputs, outputs, available design files and languages, design rule checker reports, EDA platforms used for design and validation, and interface protocols of the third party IP without disclosing proprietary information about internal company chip design requirements to the third party IP vendor, the schema having a specified dynamic format consistent with the internal design requirements and utilizing a hardware description language (HDL);

wherein the IP submission module automatically converts the received external IP design and functional specification to the schema by analyzing the design and functional specification using rule-based analysis, decomposing, and classifying a structure of the schema, and wherein the IP submission module automatically converts the received external IP information to the schema further by dynamically binding features and schema attributes at run-time during the analysis of the third party IP;

an IP qualification/certification module to qualify receive external IP information received directly from a third party IP vendor as a third party IP submission in conformance with the internal company chip design requirements; and an internal interface protocol and an external interface protocol in communication with the portal interface and the secure access layer, wherein the internal interface protocol is adapted to authorize and encrypt communications to an internal user, and wherein further the external interface protocol is adapted to authorize and encrypt communications to an external user.

16. The system of claim 15, wherein the secure access layer includes one or more of an HTTP tunnel, a firewall, or a proprietary secure access protocol.

17. The system of claim 15, wherein the portal interface is schema-based.

* * * * *